A. Cushing,
Reciprocating Saw-Mill.
Nº 37,335. Patented Jan. 6, 1863.
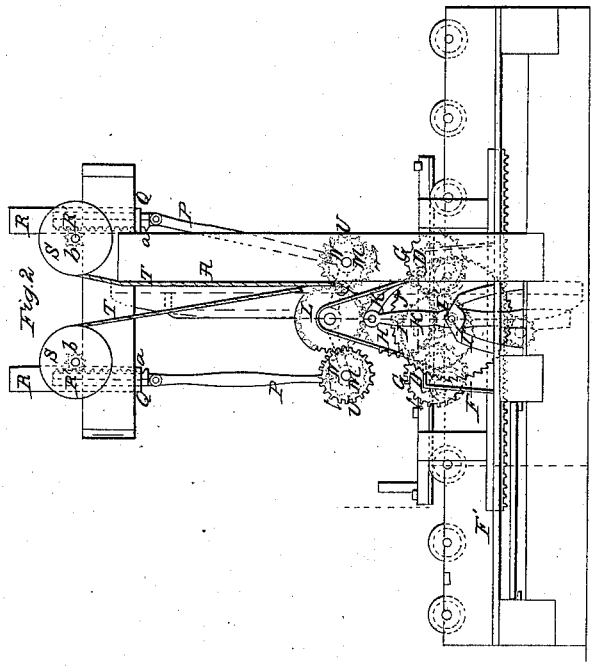
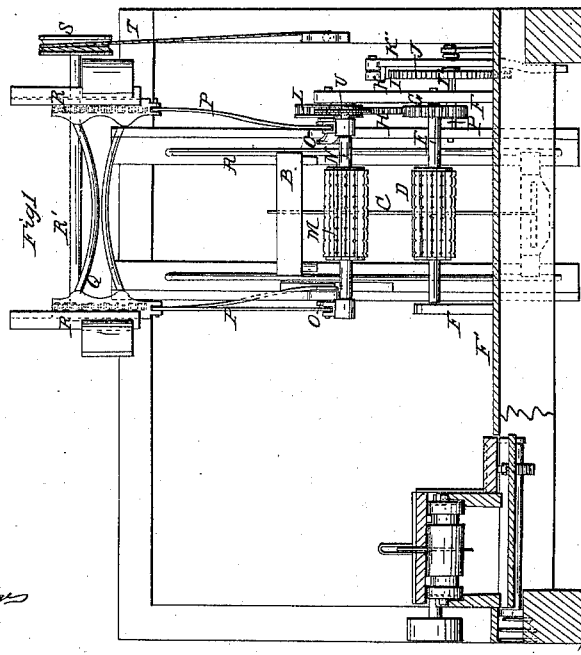

UNITED STATES PATENT OFFICE.

A. CUSHING, OF ST. JOHN, NEW BRUNSWICK.

IMPROVEMENT IN SAW-MILLS.

Specification forming part of Letters Patent No. 37,335, dated January 6, 1863.

*To all whom it may concern:*

Be it known that I, A. CUSHING, of St. John, in the Province of New Brunswick, have invented a new and useful Improvement in Saw-Mills; and I do hereby declare that the following is a full, clear, and exact description of the same, reference being had to the accompanying drawings, making a part of this specification, in which—

Figure 1 is a front view of my invention; Fig. 2, a side view of the same.

Similar letters of reference indicate corresponding parts in the two figures.

This invention relates to an improvement in the feeding devices of saw-mills, and is designed to obviate the waste of lumber consequent on the puncturing, chafing, and splitting of the same by the ordinary spiked or toothed rollers which are placed below the lumber.

The within-described invention consists in the employment or use of adjustable or rising and falling feed-rollers placed above the lumber, and used in connection with stationary feed-rollers or those placed in stationary bearings and below the lumber, as hereinafter fully shown and described.

To enable those skilled in the art to fully understand and construct my invention, I will proceed to describe it.

A represents the framing of a saw-mill, and B a reciprocating saw-sash, in which gang-saws C are placed. These parts may be arranged in the usual way, and therefore do not require a minute description.

D D are feed-rollers, the shafts E E of which have their journals fitted in upright plates F F, attached permanently to the bed-piece F'. There is a feed-roller D at each side of the saws C; and at one end of each shaft E there is placed a toothed wheel, G. These wheels G G gear into a wheel, H, and the wheel H gears into a pinion, I', on a shaft, I'', that is moved intermittingly by a ratchet and pawl, J K, the ratchet J being on the shaft I'', and the pawl K being attached to the upper end of an arm, K', which is fitted loosely on the shaft I'' by the side of the ratchet. (See more particularly Fig. 1.) The wheel H at its upper part gears into a wheel, L, the use of which will be presently shown.

M M are two feed-rollers, the shafts N N of which have their bearings in the ends of arms O O O O, two at each side of the framing A. The rollers M M are above the rollers D D, and the outer ends of the arms O are connected by rods P to vertically-sliding frames Q Q, which are fitted between proper guides, R, at the upper part of the framing A. The frames Q Q have a rack, a, at each end of them, and into these racks pinions b gear, said pinions being on shafts R' R', each of which is provided with a pulley, S, at one end. Around the pulleys S ropes T pass, as shown clearly in Fig. 2.

At one end of each shaft N N of the feed-rollers M M there is placed a wheel, V. These wheels gear into the wheel L, the shaft c of which is in line with the pivots of the arms O. In fact, said shaft c may serve as a pivot for the arms at one side of the rollers, the arms being allowed to work freely on their pivots. The lumber to be sawed passes between the feed-rollers D D M M, and said rollers are rotated in the direction indicated by the arrows in Fig. 2, the motion being communicated to the rollers from the shaft H'' through the medium of the gearing I' H G G L U U. The feed-rollers D D M M are fluted longitudinally, and they may be grooved circumferentially in order to form corrugated surfaces to prevent them from slipping on the lumber. By this arrangement it will be seen that the lumber will be fed to the saws, both at upper and lower surfaces, and that upper rollers, which have heretofore been used only as pressure-rollers, may be used as combined pressure and feed rollers. The pulleys M M are allowed to rise and fall to compensate for the irregularities or varying thickness of the lumber, and the attendant or operator may at any time elevate the rollers M, as occasion may require, by drawing down the ropes T. In consequence of having both the upper and lower rollers used as feed-rollers, the long spikes or teeth hitherto employed on the lower rollers are dispensed with, and the lumber, therefore, will not be punctured and split, as has been hitherto the case.

I do not claim, broadly, the employment or use of feed-rollers in the abstract or independently of the combination and arrangement of the same as herein shown and described; but,

Having thus described my invention, what I do claim as new, and desire to secure by Letters Patent, is—

1. Feeding or operating the upper or pressure rollers of gang-saws by a combination of means which will make them always work effectively and automatically upon all sizes and varieties of round logs with variable surfaces as well as flat timber, substantially as shown, or by an equivalent arrangement.

2. The lower feed-rollers, D D, having their shafts E fitted in stationary bearings, in combination with the upper yielding and adjustable rollers, M M, when the same have their shafts N fitted in arms O, connected to sliding frames Q Q, arranged with the racks $a$ and pinions $b$, and both pairs of rollers operated through the medium of the gearing I' H G G L U U, as and for the purpose herein shown and described.

A. CUSHING.

Witnesses:
M. S. PARTRIDGE,
TIMOTHY SHINE.